US010839090B2

(12) United States Patent
Yarlagadda et al.

(10) Patent No.: US 10,839,090 B2
(45) Date of Patent: *Nov. 17, 2020

(54) DIGITAL DATA PROCESSING SYSTEM FOR EFFICIENTLY STORING, MOVING, AND/OR PROCESSING DATA ACROSS A PLURALITY OF COMPUTING CLUSTERS

(71) Applicant: Bank of America Corporation, Charlotte, NC (US)

(72) Inventors: Sitaram C. Yarlagadda, Belmont, NC (US); Vijaya M. Anusuri, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/860,287

(22) Filed: Apr. 28, 2020

(65) Prior Publication Data

US 2020/0257813 A1 Aug. 13, 2020

Related U.S. Application Data

(63) Continuation of application No. 15/828,876, filed on Dec. 1, 2017, now Pat. No. 10,678,936.

(51) Int. Cl.
*G06F 21/62* (2013.01)
*H04L 29/08* (2006.01)
*H04L 29/06* (2006.01)

(52) U.S. Cl.
CPC .......... *G06F 21/6209* (2013.01); *H04L 63/08* (2013.01); *H04L 67/1095* (2013.01); *H04L 67/1097* (2013.01); *H04L 67/18* (2013.01)

(58) Field of Classification Search
CPC . G06F 21/6209; G06F 21/31; H04L 67/1095; H04L 67/18; H04L 67/1097; H04L 63/08
See application file for complete search history.

(56) References Cited

U.S. PATENT DOCUMENTS 6,202,124 B1  3/2001  Kern et al.
9,092,802 B1  7/2015  Akella
(Continued)

OTHER PUBLICATIONS

"BDR Tutorials" https://www.cloudera.com/documentation/enterprise/5-9-x/topics/cm_bdr_tutorials.html website visited Nov. 6, 2017 pp. 1-2.
(Continued)

*Primary Examiner* — Huan V Doan
(74) *Attorney, Agent, or Firm* — Banner & Witcoff, Ltd.; Michael A. Springs

(57) ABSTRACT

A method, apparatus, computer-readable medium, and/or system described herein may be used to efficiently store, move, and/or process data across a plurality of computing clusters. For example, a computing device may receive an indication of one or more data storage locations within a first cluster of servers and/or an indication of one or more data storage locations within a second cluster of servers. The computing device may generate a data file comprising the indication of the one or more data storage locations within the first cluster of servers and/or the indication of one or more data storage locations within the second cluster of servers. Based on the generated data file, the computing device may generate a job to move data stored at the one or more data storage locations within the first cluster of servers to the one or more data storage locations within the second cluster of servers. Based on the job, the computing device may transmit, e.g., to the first cluster of servers and/or the second cluster of servers, instructions to move data stored at the one or more data storage locations within the first cluster of servers to the one or more data storage locations within the second cluster of servers.

18 Claims, 10 Drawing Sheets

(56) References Cited

U.S. PATENT DOCUMENTS

| | | | |
|---|---|---|---|
| 9,491,241 B1 | 11/2016 | Wan et al. | |
| 2004/0103261 A1* | 5/2004 | Honda | G06F 3/0605 |
| | | | 711/202 |
| 2007/0006020 A1 | 1/2007 | Fujita | |
| 2009/0271858 A1 | 10/2009 | Cooke et al. | |
| 2010/0162230 A1 | 6/2010 | Chen et al. | |
| 2011/0161294 A1 | 6/2011 | Vengerov et al. | |
| 2012/0131591 A1 | 5/2012 | Moorthi et al. | |
| 2012/0182891 A1 | 7/2012 | Lee et al. | |
| 2012/0254292 A1 | 10/2012 | Newton et al. | |
| 2012/0254722 A1 | 10/2012 | Newton et al. | |
| 2012/0278578 A1 | 11/2012 | Castillo et al. | |
| 2013/0024412 A1 | 1/2013 | Gong et al. | |
| 2013/0132967 A1 | 5/2013 | Soundararajan et al. | |
| 2013/0166670 A1 | 6/2013 | Wayda et al. | |
| 2013/0268260 A1 | 10/2013 | Lundberg et al. | |
| 2013/0290226 A1 | 10/2013 | Dokken | |
| 2013/0318525 A1 | 11/2013 | Palanisamy et al. | |
| 2013/0345999 A1 | 12/2013 | Hafen et al. | |
| 2014/0059310 A1 | 2/2014 | Du et al. | |
| 2014/0082178 A1 | 3/2014 | Boldyrev et al. | |
| 2014/0229221 A1 | 8/2014 | Shih et al. | |
| 2014/0257047 A1 | 9/2014 | Sillay et al. | |
| 2014/0310243 A1 | 10/2014 | McGee et al. | |
| 2015/0256617 A1 | 9/2015 | Klose et al. | |
| 2015/0350316 A1 | 12/2015 | Calder et al. | |
| 2016/0055225 A1 | 2/2016 | Xu et al. | |
| 2017/0006135 A1 | 1/2017 | Siebel et al. | |
| 2017/0061138 A1 | 3/2017 | Lambert | |
| 2017/0123666 A1 | 5/2017 | Sinclair et al. | |
| 2017/0177309 A1 | 6/2017 | Bar-Or et al. | |
| 2017/0286502 A1 | 10/2017 | Bar-Or et al. | |
| 2017/0286526 A1 | 10/2017 | Bar-Or et al. | |
| 2019/0095506 A1* | 3/2019 | Challagolla | G06F 16/252 |

OTHER PUBLICATIONS

"Hadoop: HDFS Architecture Guide" https://hadoop.apache.org/docs/r1.2.1/hdfs_design.html website visited Nov. 6, 2017 pp. 1-8.

"Deployment environment" https://en.wikipedia.org/wiki/Deployment_environment website visited Nov. 21, 2017 pp. 1-5.

Todd Lipcon et al. "Kudu: Storage for Fast Analytics on Fast Data" Cloudera, inc. Sep. 28, 2015 pp. 1-13.

Todd Lipcom et al. "Kudu: New Apache Hadoop Storage for Fast Analytics on Fast Data" https://blog.cloudera.com/blog/2015/09/kudu-new-apache-hadoop-storage-for-fast-analytics-on-fast-data/ Sep. 28, 2015 pp. 1-17.

"Apache HBase: What is HBase" https://www.ibm.com/analytics/hadoop/hbase website visited Nov. 22, 2017 pp. 1-4.

Margaret Rouse "What Is multi-tenancy?—Definition from WhatIs.com" http://whatis.techtarget.com/definition/multi-tenancy website visited Nov. 6, 2017 pp. 1-5.

* cited by examiner

DIGITAL DATA PROCESSING SYSTEM FOR EFFICIENTLY STORING, MOVING, AND/OR PROCESSING DATA ACROSS A PLURALITY OF COMPUTING CLUSTERS

CROSS REFERENCE TO RELATED APPLICATION

This application is a continuation of and claims priority to patent application Ser. No. 15/828,876 entitled "Digital Data Processing System for Efficiently Storing, Moving, and/or Processing Data Across a Plurality of Computing Clusters" and filed on Dec. 1, 2017, which is incorporated by reference in its entirety.

TECHNICAL FIELD

One or more aspects of the disclosure generally relate to computing devices, computing systems, and computer software. In particular, one or more aspects of the disclosure generally relate to computing devices, computing systems, and computer software that may be used to efficiently store, move, and/or process data across a plurality of computing clusters.

BACKGROUND

In computing platforms where data is stored across many different servers, data may be moved from one or more higher-level servers to one or more lower-level servers (and vice versa). Existing systems might not be efficient because they move the data in their entirety from one server cluster to another server cluster. These systems may be inefficient, time-consuming, and require significant computing resources, such as memory resources and processing resources, to move the data. Other systems may require installation of a daemon on each node in a cluster of servers. These systems might not efficiently utilize computing resources and may be prone to errors.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

A method, apparatus, computer-readable medium, and/or system may comprise a computing device comprising one or more processors and memory. The memory may store computer-executable instructions that, when executed by the one or more processors of the computing device, cause the computing device to receive, from a user device, an indication of one or more data storage locations within a first cluster of servers. The computing device may receive, from the user device, an indication of one or more data storage locations within a second cluster of servers. The computing device may generate a data file comprising the indication of the one or more data storage locations within the first cluster of servers and/or the indication of one or more data storage locations within the second cluster of servers. Based on the generated data file, the computing device may generate a job to move data stored at the one or more data storage locations within the first cluster of servers to the one or more data storage locations within the second cluster of servers. Based on the job, the computing device may transmit, to the first cluster of servers and/or the second cluster of servers, instructions to move data stored at the one or more data storage locations within the first cluster of servers to the one or more data storage locations within the second cluster of servers.

The first cluster of servers may comprise one or more processors and memory. The memory may store computer-executable instructions that, when executed by the one or more processors of the first cluster of servers, cause the first cluster of servers to receive, from the computing device, the instructions to move the data. Based on the instructions, the first cluster of servers may identify the data stored at the one or more data storage locations within the first cluster of servers. The first cluster of servers may initiate transfer of the data stored at the one or more data storage locations within the first cluster of servers to the one or more data storage locations within the second cluster of servers.

The second cluster of servers may comprise one or more processors and memory. The memory may store computer-executable instructions that, when executed by the one or more processors of the second cluster of servers, cause the second cluster of servers to receive, from the computing device, the instructions to move the data. Based on the instructions, the second cluster of servers may identify the one or more data storage locations within the second cluster of servers. The second cluster of servers may store, at the one or more data storage locations within the second cluster of servers, the data transferred from the first cluster of servers.

In some aspects, the first cluster of servers may run in a higher level environment. The second cluster of servers may run in a lower level environment. The higher level environment may comprise a production environment. The lower level environment may comprise one or more of an acceptance testing environment, a development environment, or a system integration testing environment.

In some aspects, the computing device may authenticate a user of the user device. The computing device may determine whether the user of the user device is authorized to access one or more of the first cluster of servers or the second cluster of servers. Generating the data file may be performed after authenticating the user and/or after determining that the user is authorized to access one or more of the first cluster of servers or the second cluster of servers.

In some aspects, the computing device may determine a format of the data stored at the one or more data storage locations. Generating the data file may comprise generating the data file comprising the indication of the one or more data storage locations within the first cluster of servers, the indication of the one or more data storage locations within the second cluster of servers, and the format of the data.

In some aspects, one or more data storage locations within the first cluster of servers may comprise one or more files within the first cluster of servers. One or more data storage locations within the second cluster of servers may comprise one or more files within the second cluster of servers.

In some aspects, receiving the indication of one or more data storage locations within the first cluster of servers may comprise receiving, from the user device, a plurality of source paths associated with the one or more data storage locations within the first cluster of servers. Receiving the indication of one or more data storage locations within the second cluster of servers may comprise receiving, from the user device, a plurality of destination paths associated with the one or more data storage locations within the second cluster of servers.

In some aspects, based on the one or more data storage locations within the first cluster of servers, the computing device may determine a plurality of clusters of servers for which the data can be moved to. The plurality of clusters of servers may include the second cluster of servers. The computing device may transmit, to the user device, an indication of the plurality of clusters of servers.

In some aspects, the computing device may generate one or more identifiers for the job to move data stored at the one or more data storage locations within the first cluster of servers to the one or more data storage locations within the second cluster of servers. The computing device may transmit, to the user device, the one or more identifiers.

In some aspects, generating the job may be based on a data type of the data stored at the one or more data storage locations within the first cluster of servers.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized, and that structural and functional modifications may be made, without departing from the scope of the present claimed subject matter.

Figure 1:
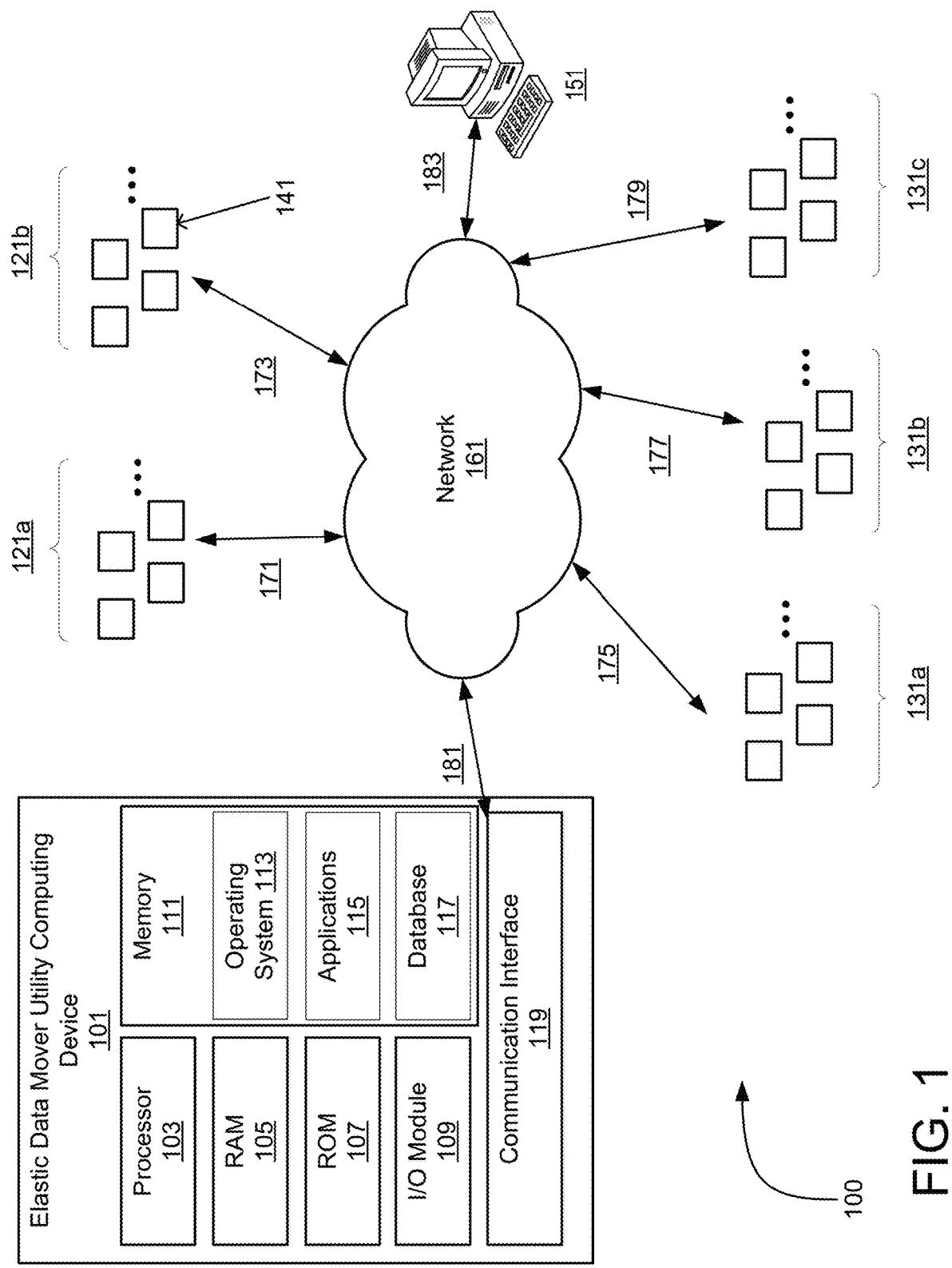
FIG. 1 illustrates an example operating environment in which various aspects of the disclosure may be implemented.

FIG. 1 illustrates an example operating environment in which various aspects of the disclosure may be implemented. An illustrative system 100 for implementing methods according to the present disclosure is shown. System 100 may include an elastic data mover utility (EDMU) computing device 101. As will be described in further detail below, the computing device 101 may facilitate efficient storage, movement, and/or processing of data across a plurality of computing clusters. In some aspects, the system 100 may facilitate movement of a subset of data from one environment to another environment, which may result in more efficient use of processing resources and resources for storing data.

The computing device 101 may have a processor 103 for controlling overall operation of the computing device and its associated components, including for example random access memory (RAM) 105, read-only memory (ROM) 107, input/output (I/O) module 109, and memory 111. I/O module 109 may include, e.g., a microphone, mouse, keypad, touch screen, scanner, optical reader, and/or stylus (or other input device(s)) through which a user of computing device 101 may provide input, and may also include one or more of a speaker for providing audio output and a video display device for providing textual, audiovisual, and/or graphical output. Software may be stored within memory 111 and/or other storage to provide instructions to processor 103 for enabling computing device 101 to perform various functions. For example, memory 111 may store software used by the computing device 101, such as an operating system 113, application programs 115, and an associated database 117. Additionally or alternatively, some or all of the computer executable instructions for computing device 101 may be embodied in hardware or firmware.

The computing device 101 may operate in a networked environment supporting connections, such as connection 181, to one or more other computers, such as various clusters of computing devices (e.g., server clusters). For example, the system 100 may comprise a server cluster 121a, a server cluster 121b, a server cluster 131a, a server cluster 131b, a server cluster 131c, and other server clusters (not illustrated). Each server cluster may comprise a plurality of servers, such as server 141 in the server cluster 121b. Each server cluster (or server in a server cluster) may include any or all of the elements described above with respect to the computing device 101. Each server cluster (or server in a server cluster) may additionally or alternatively include any or all of the elements of the computing device 201, as will be described in further detail below with reference to FIG. 2. The network connections depicted in FIG. 1 include a local area network (LAN), and a wide area network (WAN), but may also include other networks. The computing device 101 may communicate with other computing devices using a communication interface 119 or other network interface for establishing communications over a LAN and/or a WAN, such as the Internet. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Each server cluster may be connected by one or more communications links 171, 173, 175, 177, and/or 179 to network 161. The system 100 may include a plurality of higher-level environments (and their associated computing devices or servers). For example, the server cluster 121a and the server cluster 121b may run in a higher-level environment, such as a production environment. The system 100 may include a plurality of lower level environments (and their associated computing devices or servers). For example, the server cluster 131a, server cluster 131b, and server 131c may run in a lower level environment. Examples of lower level environments include, but are not limited to, user acceptance testing environments, development environments, system integration testing environments, and the like. The system 100 may include a plurality of intermediate level environments (not illustrated), which may reside between the higher-level environments and the lower level environments.

In some aspects, large amounts of data may be stored in one or more of the higher level environments (and their associated computing devices or servers) and/or the lower level environments (and their associated computing devices or servers). Systems described herein may support big data. For example, each file stored in the system 100 may be gigabytes to terabytes in size, and millions of files may be stored in the system 100.

Data may be moved between the server clusters, such as from servers in a higher level environment (e.g., production environment) to servers in a lower level environment (e.g., development, system integration testing, and/or user acceptance testing environments). Entire data or subsets of data, which may be grouped by technology group, can be moved between environments. For example, data residing in different clusters may be moved by file, by directory, and/or by set of directories. In some aspects, smaller amounts of data (as opposed to a whole cluster of data) may be moved. The system may more efficiently use fewer processing and/or storage resources for these moves. For example, a computing device may select which processors and/or storage resources (which may comprise a subset of the available processors and/or storage resources in the system) to use to move the data. Data may be stored in different formats, and each cluster may support a particular type of format.

For example, data may be stored in a first format on a distributed file system. Each environment in a system may comprise a plurality of servers (e.g., hundreds or thousands of servers), and each server may store a portion of the system's data. Each environment may also support high throughput of data and may support batch processing of jobs. In distributed file systems, two or more distributed file system services may run on different clusters.

Data may be stored in a second format on, for example, a column-oriented database management system. The data may be stored in a set of tables, and each table may be identified using a key. Attempts to access the table may require use of the key. Each table stored in the system may comprise a plurality of rows and a plurality of columns. In some aspects, a central node in a cluster of nodes may be used to manage the other nodes in the cluster. A plurality of nodes may store portions of the tables.

Data may be stored in a third format on, for example, a storage system comprising a plurality of tables of structured data. Each table may comprise a plurality of columns, and the number of columns may be predetermined. Each table may also comprise an index used to identify the table. The index may comprise data from one or more of the table's columns.

Based on the size of the data being transferred, an EDMU algorithm running on the computing device may run parallel jobs. Data transfer may be quick when large files are transferred between clusters. If smaller files are transferred between clusters, resources might not be over utilized and may be saved for other processes. That is, elasticity of choosing custom data for higher level and lower level activities may be provided by one or more aspects described herein. As previously explained, a computing device may select which processors and/or storage resources (which may comprise a subset of the available processors and/or storage resources in the system) to use to move the data. Assigned resource pools may be utilized to execute data movement. Data may be transferred at any time, and scheduled replication might not be needed.

The system 100 may comprise one or more user devices, such as user device 151 and other user devices (not illustrated). The user device 151 may be used, such as by a user, to authenticate with the computing device 101. The user device 151 may also be used by the user to provide information for moving data from one or more server clusters to one or more other server clusters, as will be described in further detail below. For example, a user with appropriate permissions can use the EDMU algorithm from a command line. The user device 151 may include input devices for receiving user input, such as a touchscreen display, a physical keyboard, a microphone, a mouse, and the like. The user device 151 may communicate with the computing device 101 and/or the server clusters via the network 161 and a network connection 183.

Network 161 may be any suitable network including a cloud network, the Internet, an intranet, a wide-area network (WAN), a local-area network (LAN), a wireless network, a digital subscriber line (DSL) network, a frame relay network, an asynchronous transfer mode (ATM) network, a virtual private network (VPN), a cellular network, or any combination of any of the same. Communications links 171, 173, 175, 177, 179, 181, 183, or other communication links may be any communications links suitable for communicating among the elastic data mover utility computing device 101, server clusters 121 and 131, user devices 151, and/or other devices, such as network links, dial-up links, wireless links, hard-wired links, or other communications links. In some aspects, the TCP/IP protocol may be used for communication.

Figure 2:
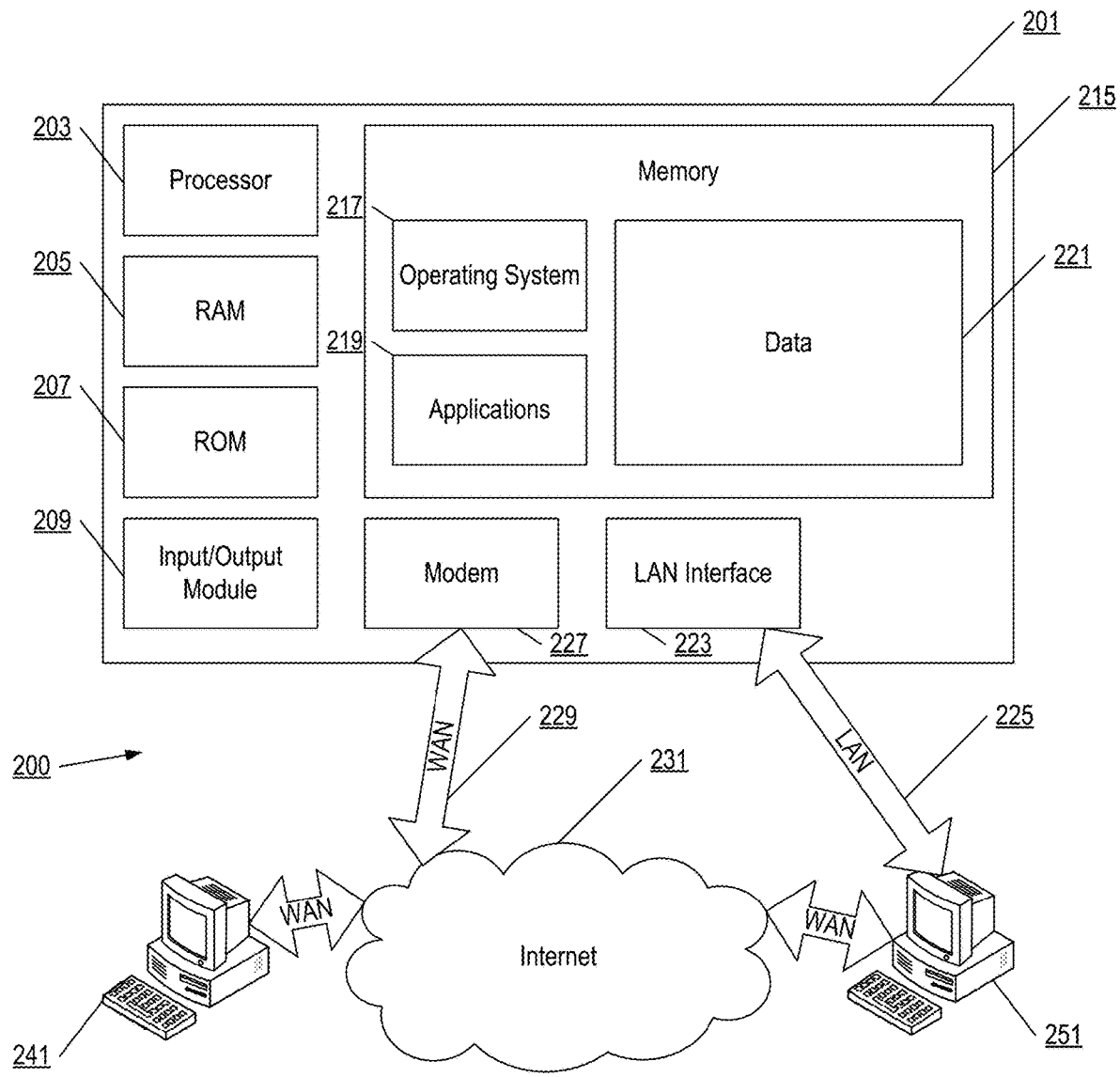
FIG. 2 illustrates another example operating environment in which various aspects of the disclosure may be implemented.

FIG. 2 illustrates an example block diagram of a computing device 201 (e.g., a computer server, desktop computer, laptop computer, tablet computer, other computing devices) in an example computing environment 200 that may be used according to one or more illustrative embodiments of the disclosure. The computing device 201 may have a processor 203 for controlling overall operation of the server and its associated components, including for example random access memory (RAM) 205, read-only memory (ROM) 207, input/output (I/O) module 209, and memory 215.

I/O module 209 may include, e.g., a microphone, mouse, keypad, touch screen, scanner, optical reader, and/or stylus (or other input device(s)) through which a user of computing device 201 may provide input, and may also include one or more of a speaker for providing audio output and a video display device for providing textual, audiovisual, and/or graphical output. Software may be stored within memory 215 and/or other storage to provide instructions to processor 203 for enabling computing device 201 to perform various functions. For example, memory 215 may store software used by the computing device 201, such as an operating system 217, application programs 219, and an associated database 221. Additionally or alternatively, some or all of the computer executable instructions for computing device 201 may be embodied in hardware or firmware (not shown).

The computing device 201 may operate in a networked environment supporting connections to one or more remote computers, such as terminals 241 and 251. The terminals 241 and 251 may be personal computers or servers that include any or all of the elements described above with respect to the computing device 201. The network connections depicted in FIG. 2 include a local area network (LAN) 225 and a wide area network (WAN) 229, but may also include other networks. When used in a LAN networking environment, the computing device 201 may be connected to the LAN 225 through a network interface or adapter 223. When used in a WAN networking environment, the computing device 201 may include a modem 227 or other network interface for establishing communications over the WAN 229, such as the Internet 231. It will be appreciated that the network connections shown are illustrative and other means of establishing a communications link between the computers may be used. The existence of any of various well-known protocols such as TCP/IP, Ethernet, FTP, HTTP, HTTPS, and the like is presumed. Computing device 201 and/or terminals 241 or 251 may also be mobile devices (e.g., mobile phones, smartphones, PDAs, notebooks, tablets, other mobile devices) including various other components, such as a battery, speaker, and antennas.

Figure 3:
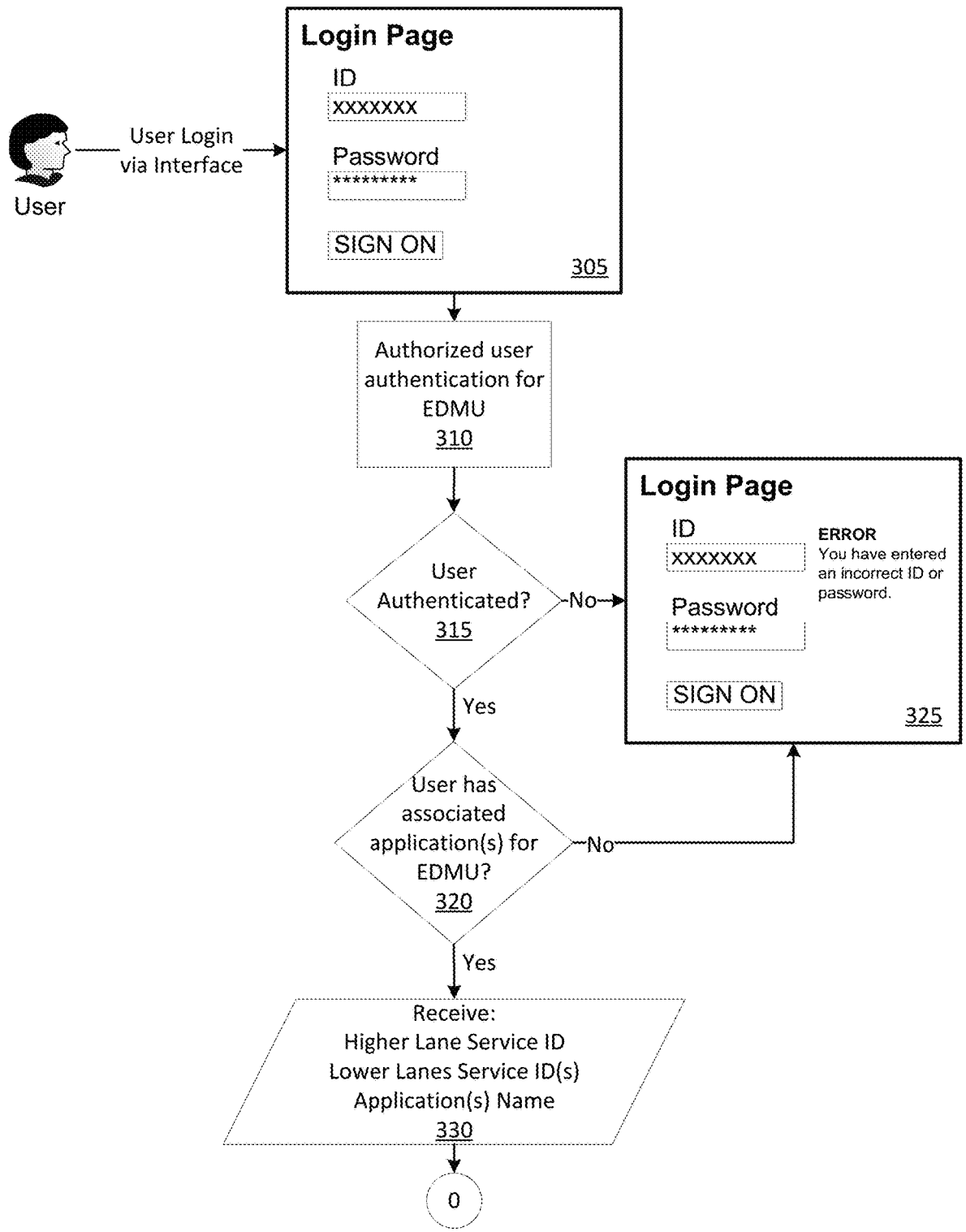
FIG. 3 illustrates an example of at least a portion of a flow diagram for efficiently storing, moving, and/or processing data across a plurality of computing clusters in which various aspects of the disclosure may be implemented.

FIG. 3 illustrates an example of at least a portion of a flow diagram for efficiently storing, moving, and/or processing data across a plurality of computing clusters in which various aspects of the disclosure may be implemented.

In step 305, an interface, such as a web interface, may be displayed on a user device (e.g., a laptop computer, a desktop computer, a mobile phone, and the like), such as the user device 151. For example, the interface may be a login page. The user of the user device may input credentials, such as an ID and/or username and password, to login via the interface. As another example, the user may provide, via one or more sensors of the user device, biometrics, such as a facial scan, a fingerprint, a voiceprint, and the like. The user device 151 may transmit, via a network (e.g., network 161) and/or a communication link (e.g., communication link 183), the received credentials to a computing device, such as the elastic data mover utility computing device 101. In some aspects, the user may login to, for example, an EDMU website via single-sign on mechanisms. Data may be moved with one-way authentication, such as Kerberos one-way authentication, which may be integrated with the directory group.

In step 310, the computing device may receive the credentials from the user device and attempt to authenticate the user based on the credentials. For example, the computing device may use an authentication module to compare the received credentials to stored credentials. In step 315, the computing device may determine whether the user is authenticated. If the user is not authenticated (step 315: No), the computing device may transmit, to the user device, an indication that the authentication attempt failed. In step 325, the user device may display an indication that the authentication attempt failed (e.g., that the ID and/or password are incorrect) and/or request alternative credentials from the user. If, on the other hand, the user is authenticated (step 315: Yes), the method may proceed to step 320.

In step 320, the computing device may determine whether the authenticated user has one or more associated application(s) for the elastic data mover utility. For example, the computing device may retrieve application(s) names associated with the user's login information. The computing device may determine which lower level environment(s) (and/or their associated clusters of servers) and/or which higher level environment(s) (and/or their associated clusters of servers) for which the user is authorized to access. If the user is not authorized to access any applications for the elastic data mover utility (step 320: No), the computing device may proceed to step 325 and/or display an indication that the user does not have access to one or more EDMU applications. The user may also be logged out of the system. If, on the other hand, the user is authorized to access one or more applications for the elastic data mover utility (step 320: Yes), the computing device may proceed to step 330.

In step 330, the user may be requested to indicate from which higher level environment(s) (e.g., a production environment) to which lower level environment(s) data is to be moved. For example, the computing device may transmit, to the user device, a reference indicating a list of available higher level environments, their associated computing devices, and/or the service ID(s) for the higher level environments. The reference may indicate a list of available lower level environments, their associated computing devices, and/or the service ID(s) for the lower level environments. The reference may also indicate one or more application(s) names. The available environments may comprise the environments for which the user is authorized. For example, assume that six higher level production environments exist. The user may be authorized for two of the six production environments, and the computing device may transmit, to the user device, a list comprising the two production environments, for example, for which the user is authorized. The list might not include the four production environments for which the user is not authorized. The method may proceed to perform one or more steps illustrated in FIG. 4, such as displaying a user interface to receive information from the user.

Figure 4:
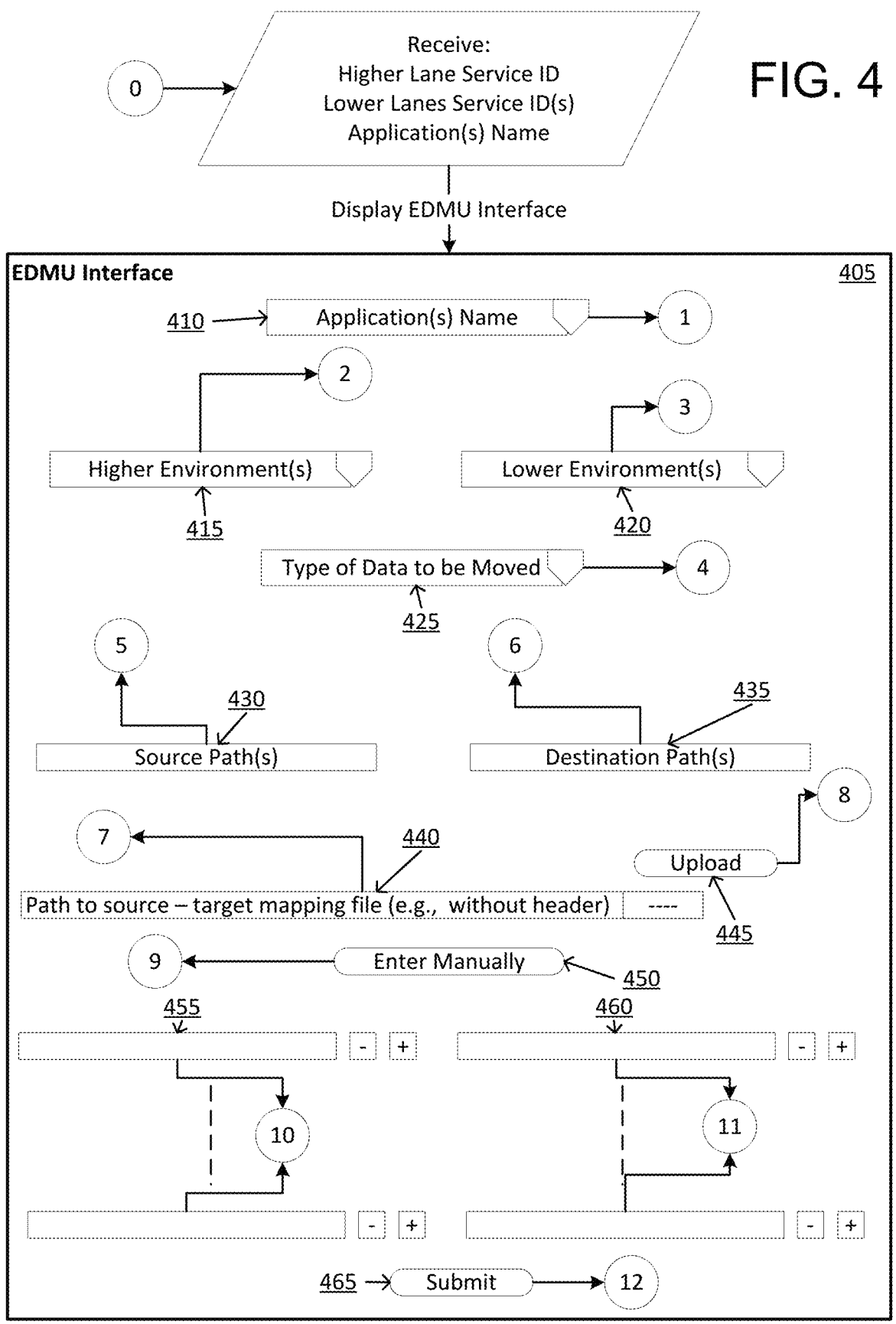
FIG. 4 illustrates an example of at least a portion of a flow diagram and/or user interface for efficiently storing, moving, and/or processing data across a plurality of computing clusters in which various aspects of the disclosure may be implemented.

FIG. 4 illustrates an example of at least a portion of a flow diagram and/or user interface 405 for efficiently storing, moving, and/or processing data across a plurality of computing clusters in which various aspects of the disclosure may be implemented. In some aspects, the interface 405 may comprise a home page. The user interface 405 may display, such as via a drop down list, one or more application names 410. As previously explained, the user device may have received the application names from the computing device. The user interface 405 may display, such as via a drop down list, a list of available higher level environments 415. As previously explained, the user device may have received the list of higher level environments from the computing device. The user interface 405 may display, such as via a drop down list, a list of available lower level environments 420. As previously explained, the user device may have received the list of lower environments from the computing device. The user interface 405 may display a list of type(s) of data to be moved 425. For example, the type(s) of data may comprise distributed file system data, row-based data, column-based data, distributed database data, and the like. In some aspects, the user may select the data type(s) 425 using a drop down list and/or selecting boxes associated with each data type.

Figure 5:
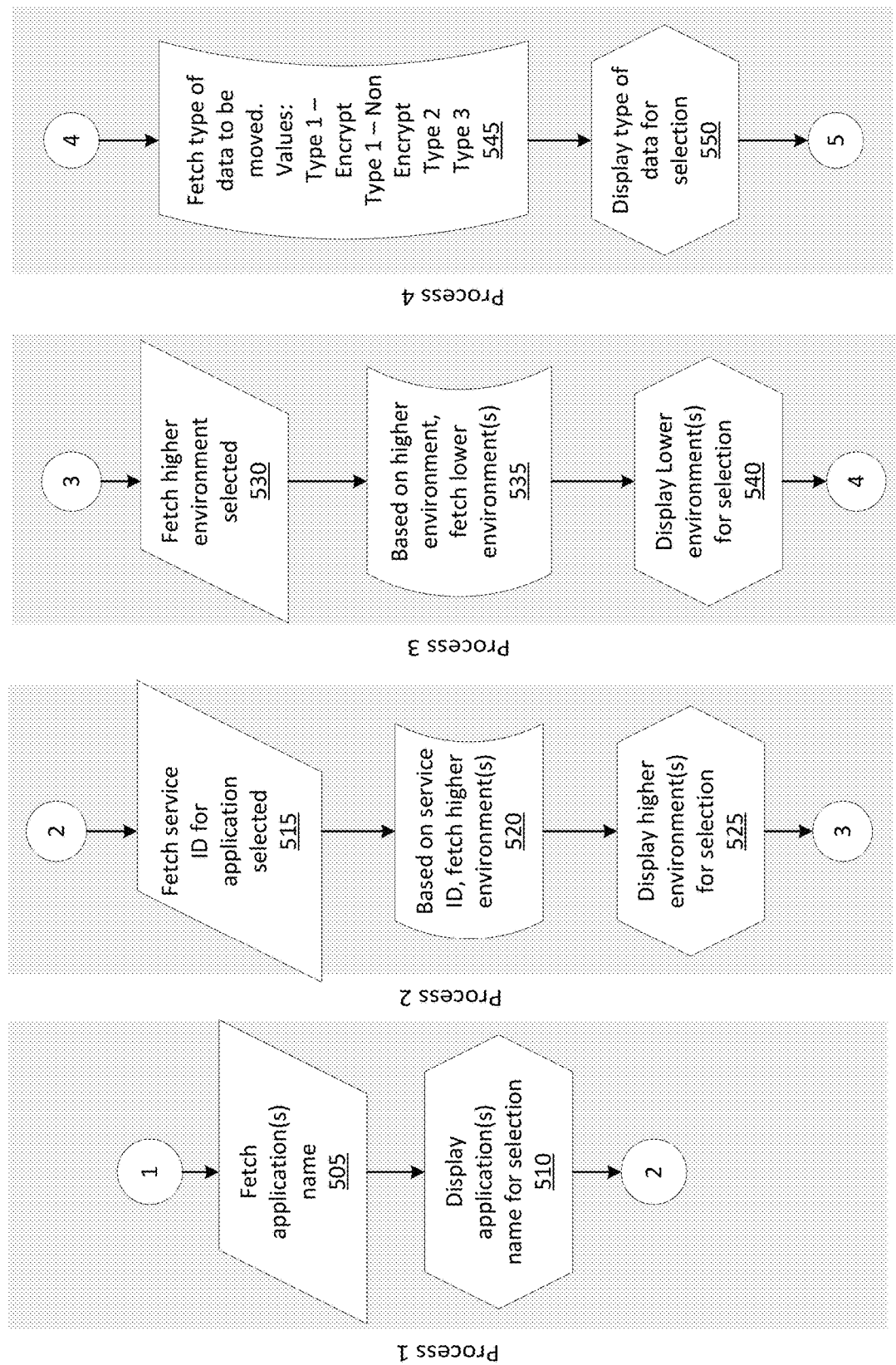
FIG. 5 illustrates an example of at least a portion of a flow diagram for efficiently storing, moving, and/or processing data across a plurality of computing clusters in which various aspects of the disclosure may be implemented.

FIG. 5 illustrates an example of at least a portion of a flow diagram for efficiently storing, moving, and/or processing data across a plurality of computing clusters in which various aspects of the disclosure may be implemented. For example, one or more of the options displayed on the user interface 405 may be accessed and displayed via one or more processes.

In a first process, application name(s) may be fetched and/or displayed. In step 505, the user device may fetch, such as from the computing device, one or more application(s) names. In step 510, the user device may display, on a display of the user device, the application(s) names as, for example, a drop down list from which the user may select.

In a second process, available higher level environment(s) may be fetched and/or displayed. In step 515, the computing device may fetch a service ID for each selected application. In step 520, based on the service ID, the computing device may fetch a list of the corresponding higher level environment(s). The computing device may transmit the list to the user device, and in step 525, the user device may display the list of available higher environment(s), such as a drop down list from which the user may select.

In a third process, available lower level environment(s) may be fetched and/or displayed. In step 530, the computing device may fetch the selected higher level environment(s). In step 535, based on the higher level environment(s), the computing device may fetch one or more lower level environment(s) for which the data from the higher environment(s) may be moved. For example, data from some higher level environments may be moved to some (but not all) lower level environments. The computing device may transmit the list to the user device, and in step 540, the user device may display the list of available lower environment(s), such as a drop down list from which the user may select.

In a fourth process, the type(s) of data to be moved may be fetched and/or displayed. In step 545, the user device may fetch the type(s) of data to be moved. As previously explained, the type(s) of data may include, for example, distributed file system data, row-based data, column-based data, distributed database data, and the like. In some aspects, the data may be encrypted or unencrypted, and the data type may indicate whether the data is encrypted or unencrypted. In step 550, the user device may display the available data types, such as in a drop down list or as option boxes selectable by the user.

Once environment selection is done, the user may be prompted to select other parameters, such as single or multiple source paths, single or multiple destination paths, and the like. Returning to FIG. 4, the user interface 405 may display entry field(s) 430 to receive input of one or more source path(s) for the data to be moved. The user interface 405 may also display entry field(s) 435 to receive input of one or more destination path(s) for which to move the data to. In some aspects, the user may specify the data to move at a more granular level, such as a particular file location in one server cluster to another file location in a different server cluster. Data may be moved more efficiently by specifying particular pieces of data (e.g., partial data) to move, rather than having to move data in its entirety from one cluster to another cluster. This may result in using fewer processing resources and/or data storage resources, freeing up those resources for other processes and/or to store other data.

The user interface 405 may display entry field(s) 440 to receive input of one or more source to target mapping file and/or a path of the source to target mapping file. In some aspects, the user may input the source to target mapping file without a header. The mapping file may comprise a comma-separated values file or another type of file. The user interface 405 may display an upload option 445 for the user to upload a file and/or an option 450 for the user to manually enter the file and/or path of the file.

Figure 6:
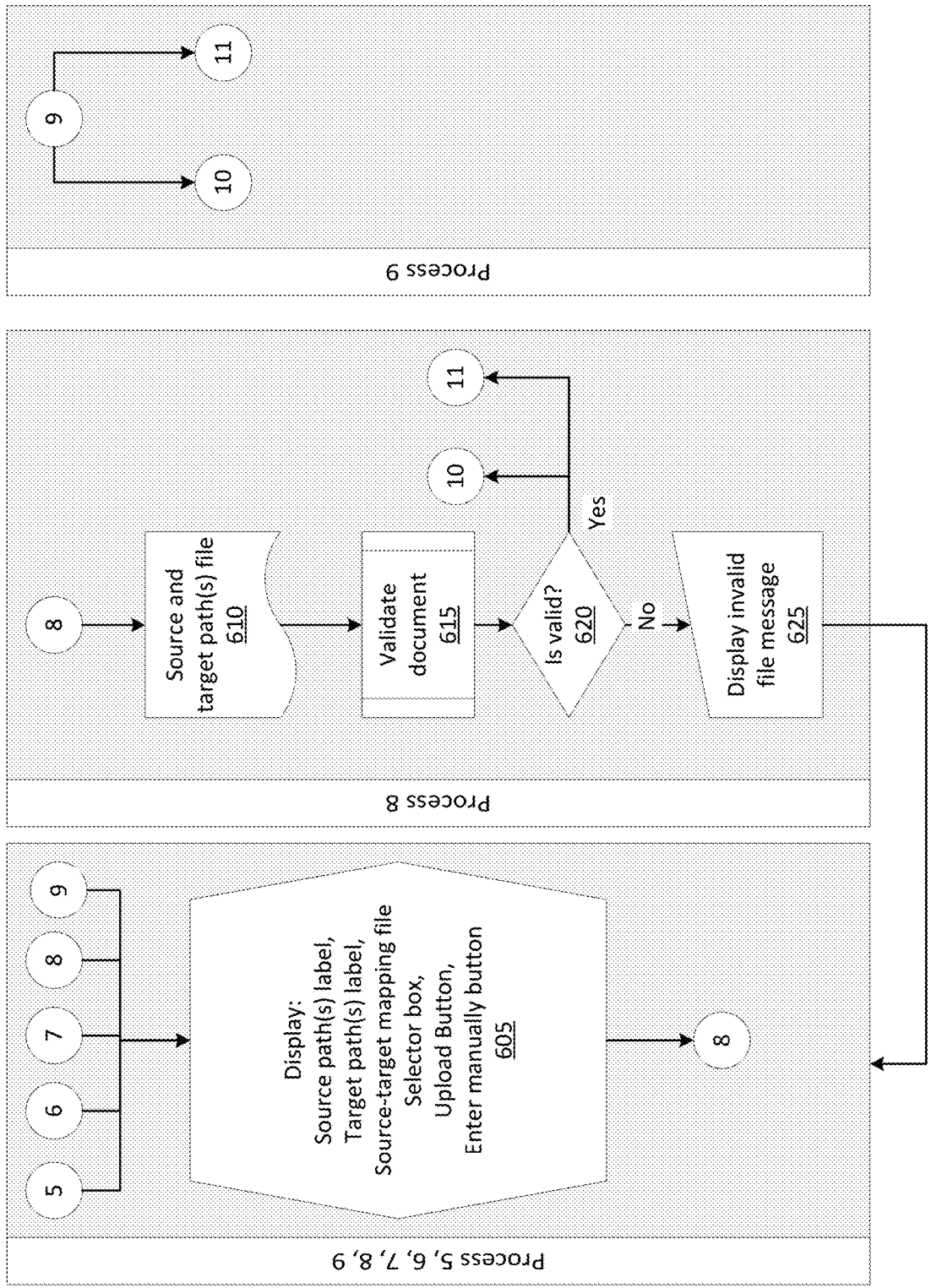
FIG. 6 illustrates an example of at least a portion of one or more flow diagrams for efficiently storing, moving, and/or processing data across a plurality of computing clusters in which various aspects of the disclosure may be implemented.

FIG. 6 illustrates an example of at least a portion of one or more flow diagrams for efficiently storing, moving, and/or processing data across a plurality of computing clusters in which various aspects of the disclosure may be implemented. In a fifth, sixth, seventh, eighth, and ninth process, various options and data entry fields may be displayed on the user device. For example, the user interface 405 may display source path(s) labels, target path(s) labels, a source-target mapping file (e.g., a csv file), a selector box, an upload button, and/or an enter manually button.

The computing device may perform one or more steps if the upload button 445 is selected by the user. In step 610, the computing device may receive the source to target path(s) file (e.g., a csv file). In step 615, the computing device may attempt to validate the document. In step 620, the computing device may determine whether the document is valid. If the document is not valid (step 620: No), the computing device transmit, to the user device, a message indicating that the document is not valid. In step 625, the user device may display, to the user, a message (e.g., a pop up message) indicating that the file is invalid. On the other hand, if the document is valid (step 620: Yes), the method may proceed to process 10 and/or process 11, as will be described in further detail below. Similarly, in process 9, if the user selected the enter manually button 450 on the user interface 405, the method may proceed to process 10 and/or process 11.

Returning to FIG. 4, the user interface 405 may display one or more data entry field(s) 455 for the user to provide one or more sources for the data to be moved. The user may select an option (e.g., a '+' button) to add more source(s). The user may also select an option (e.g., a '−' button) to remove a particular source. In some aspects, each data entry field 455 may indicate a file or folder storing the data in the source. Each source may be within the same cluster of servers or may be from different clusters. For example, a first source path may be https://AAA.BBB.com/CCC/DDD/EE-EEE, and a second source path may be https://FFFFF-.GGGGG.com/HH/IIIIIII/KKKKK.

The user interface 405 may display one or more data entry field(s) 460 for the user to provide one or more destinations for the data to be moved. The user may select an option (e.g., a '+' button) to add more destination(s). The user may also select an option (e.g., a '−' button) to remove a particular destination. In some aspects, each data entry field 460 may indicate a file or folder at the destination for which to move the data. Each destination may be within the same cluster of servers or may be different clusters.

Figure 7:
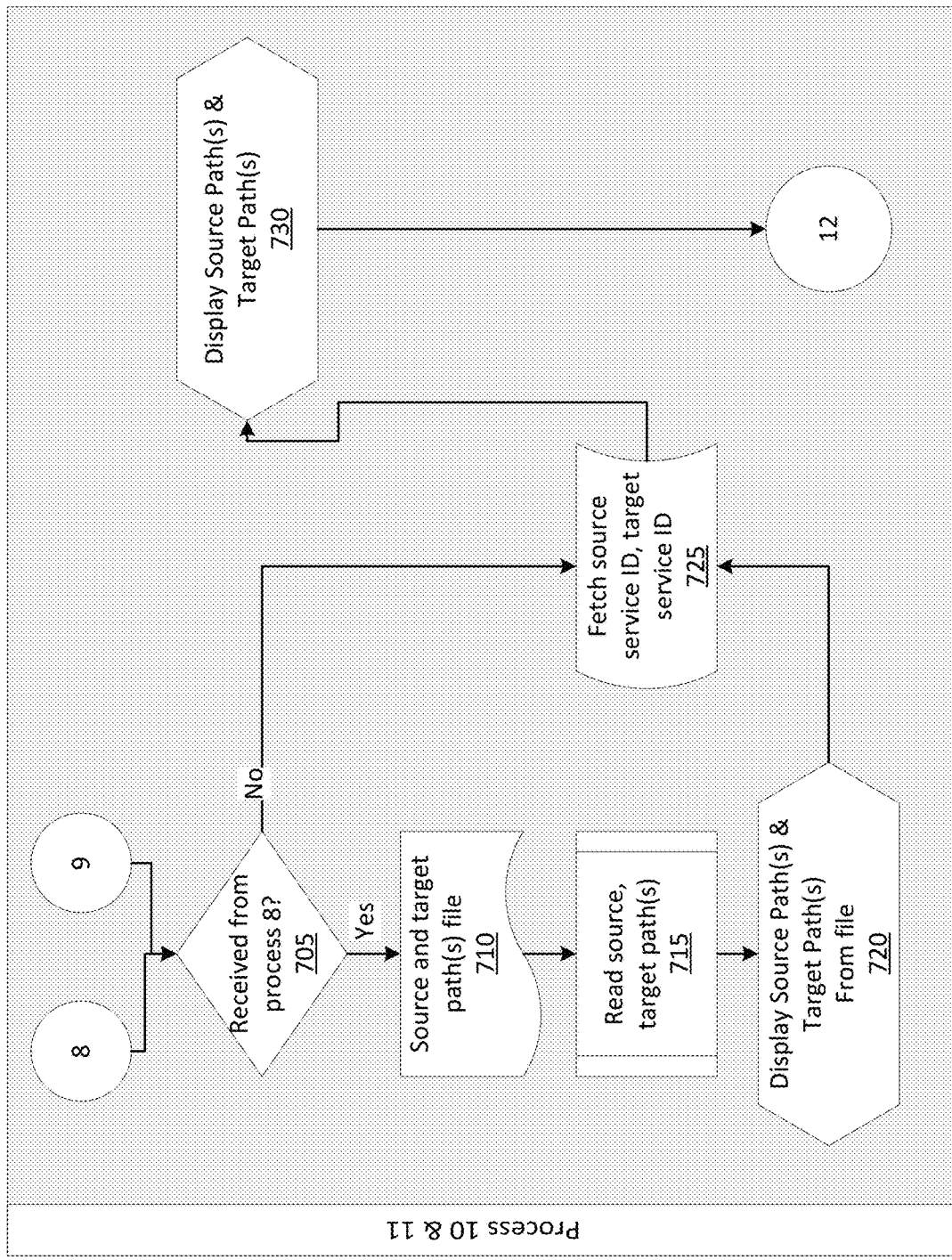
FIG. 7 illustrates an example of at least a portion of a flow diagram for efficiently storing, moving, and/or processing data across a plurality of computing clusters in which various aspects of the disclosure may be implemented.

FIG. 7 illustrates an example of at least a portion of a flow diagram for efficiently storing, moving, and/or processing data across a plurality of computing clusters in which various aspects of the disclosure may be implemented. In some aspects, one or more of the steps illustrated in FIG. 7 may be performed if the uploaded source to target file is validated (e.g., step 620: Yes) or if the user decided to manually enter the source to target file. Process 10 and/or process 11 illustrate a method for displaying one or more source path(s) and one or more target path(s).

In step 705, the computing device may determine whether the instruction resulted from process 8 or not (e.g., resulted from process 9). If the instruction did not result from process 8 (step 705: No), the method may proceed to step 725, as will be described in further detail below. If the instruction resulted from process 8 (step 705: Yes), the method may proceed to step 710.

In step 710, the computing device may access the source and target path(s) file, which may comprise a source and target path csv file. In step 715, the computing device may read the source path(s) and/or the target path(s) from the file. In step 720, the computing device may transmit, to the user device, the source path(s) and/or the target path(s) from the file. The user device may display the source path(s) and/or the target path(s) from the file, such as via the user interface 405. The method may proceed to step 725.

In step 725, the computing device may fetch one or more source service IDs and one or more target service IDs. In step 730, the computing device may transmit, to the user device, the source path(s) and/or the target path(s) associated with the service IDs. The user device may display the source path(s) and/or the target path(s), such as via the user interface 405. The method may proceed to process 12, as will be described in further detail below.

Figure 8:
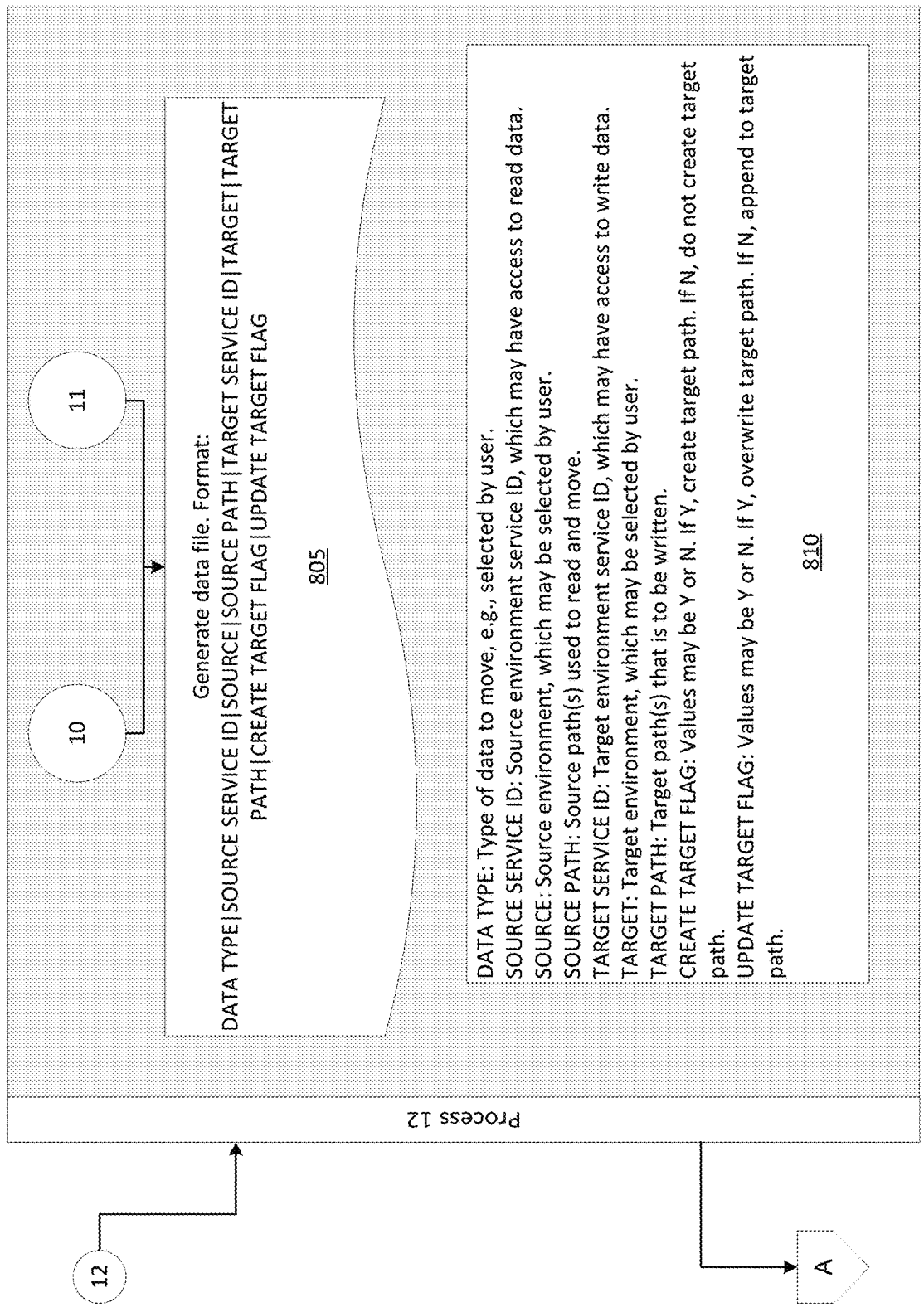
FIG. 8 illustrates an example of at least a portion of a flow diagram for efficiently storing, moving, and/or processing data across a plurality of computing clusters in which various aspects of the disclosure may be implemented.

Returning to FIG. 4, the user interface 405 may display an option 465 to submit the information populated in one or more of the data entry fields illustrated in FIG. 4. If the user selects the option 465, the method may proceed to process 12, as illustrated in FIG. 8. Briefly, the computing device may build one or more respective jobs once the paths are selected. The computing device may submit or transmit the job(s) to a lower environment cluster and/or a higher environment cluster, and may provide custom code for data movement. Once the jobs are submitted, the user may be provided with, for example, application master ID(s) for tracking the jobs.

FIG. 8 illustrates an example of at least a portion of a flow diagram for efficiently storing, moving, and/or processing data across a plurality of computing clusters in which various aspects of the disclosure may be implemented. In process 12, a data file may be generated (e.g., prepared) for moving data to one or more target clusters.

In step 805, the computing device may generate a data file comprising a plurality of pieces of data. For example, the data may have a format comprising one or more of the following fields 810:

DATA TYPE|SOURCE SERVICE ID|SOURCE-|SOURCE PATH|TARGET SERVICE ID|TARGET|TARGET PATH|CREATE TARGET FLAG|UPDATE TARGET FLAG

The DATA TYPE field may indicate the type of data to be moved. The data type may be selected by user.

The SOURCE SERVICE ID field may comprise a source environment service ID that has, for example, read access to the data.

The SOURCE field may indicate the source environment, which may be selected by the user. For example, the source environment may be a source cluster from where the data is to be moved.

The SOURCE PATH field may indicate the source path(s) used to read and move the data. For example, the source path may comprise a distributed file system directory path of the source.

The TARGET SERVICE ID field may indicate a target environment service ID, which may have write access to the data.

The TARGET field may indicate the target environment, which may be selected by the user. For example, the target environment may be a target cluster to which the data is to be moved.

The TARGET PATH field may indicate the target path(s) that are to be written. For example, the target path may comprise a distributed file system directory path of the target.

The CREATE TARGET FLAG may comprise a flag that indicates whether a target directory is to be created (e.g., if the directory is not already present). The flag may comprise a value of Y or N. If the value is Y, the computing device may create a target path (e.g., distributed file system path) in the target. If the value is N, the computing device might not create a target path (e.g., distributed file system path) in the target. The script may exit with a message to the web interface.

The UPDATE TARGET FLAG may comprise a flag that indicates whether the data is to be updated or overwritten in the target path (e.g., directory). The flag may comprise a value of Y or N. If the value is Y, the target path may be overwritten. If the value is N, the target path may be appended with the new target path.

Figure 9:
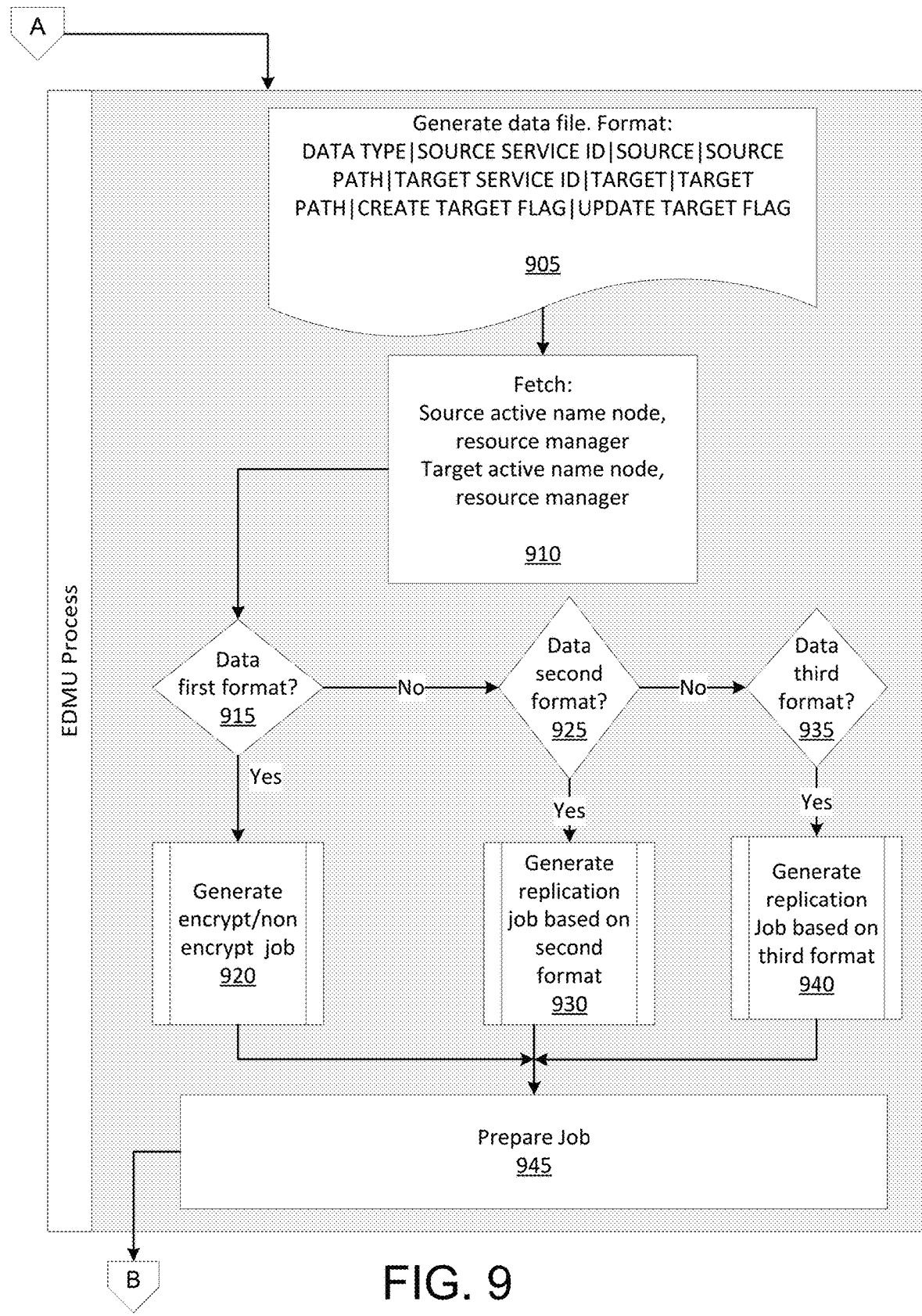
FIG. 9 illustrates an example of at least a portion of a flow diagram for efficiently storing, moving, and/or processing data across a plurality of computing clusters in which various aspects of the disclosure may be implemented.

The data may be submitted as input to an EDMU data movement process (e.g., a script). FIG. 9 illustrates an example of at least a portion of a flow diagram for efficiently storing, moving, and/or processing data across a plurality of computing clusters in which various aspects of the disclosure may be implemented. In some aspects, the process illustrated in FIG. 9 may comprise an EDMU data movement process. As previously explained, in step 805, the computing device may generate (e.g., prepare) a data file comprising a plurality of pieces of data. Step 905 illustrates an example of a format of the data file. Once the data is received, the EDMU process (which may be running on the computing device) may validate the received data. If errors and/or discrepancies are found, the EDMU process may report an error message. If the data is validated, the EDMU process may proceed to step 910.

In step 910, the computing device may read one or more configuration files for one or more operations. The computing device may read a cluster name nodes configuration file and fetch a source cluster name node and/or a target cluster name node from the cluster name nodes configuration file. Based on the collected information, the computing device may check for the active name node and resource manager. The computing device may read a server ID mapping configuration file. Based on the service ID submitted, the computing device may retrieve the respective production service ID.

In step 915, the computing device may determine whether the data is formatted according to a first format. For example, the first format may comprise a distributed file system format. If the data is formatted according to the first format (step 915: Yes), in step 920, the computing device may generate a job to move the data formatted according to the first format. The computing device may generate the job based on the information included in the data file. The data may be encrypted or may be unencrypted, and the computing device may generate the job based on the encryption of the data. In some aspects, the job may comprise a distributed copy command, and the copy command may be performed by a plurality of nodes in a cluster of servers. The command may indicate a source active name node, a target active name node, a source path (e.g., distributed file system source path), a target path (e.g., distributed file system target path), and/or a number of jobs (e.g., up to 250 jobs). The source path may indicate the type of distributed file system used to store the data, the name of the cluster storing the data, a user, and an identifier. For example, the source path may be formatted as follows: [type of distributed file system]://[name of cluster]/[user]/[an identifier]. The target path may indicate the type of distributed file system of the target, the name of the cluster for which to send the data, a user, and an identifier. For example, the target path may be formatted as follows: [type of distributed file system]://[name of cluster]/[user]/[an identifier]. If the data is not formatted according to the first format (step 915: No), the computing device may proceed to step 925.

In step 925, the computing device may determine whether the data is formatted according to a second format. For example, the second format may comprise a column-oriented key-value format. As previously explained, the data in this format may be stored in a set of tables, and each table may be identified using a key. The tables may be accessed using the keys. If the data is formatted according to the second format (step 925: Yes), in step 930, the computing device may generate a job to move the data formatted according to the second format. In some aspects, the job may comprise a replication job for the data formatted according to the second format. If the data is not formatted according to the second format (step 925: No), the computing device may proceed to step 935.

In step 935, the computing device may determine whether the data is formatted according to a third format. For example, the third format may comprise a column storage format (or a row storage format). As previously explained, a system storing data in a column storage format may comprise a plurality of tables of data, and each table may comprise a plurality of columns. Each table may comprise an index used to identify the table. If the data is formatted according to the third format (step 935: Yes), in step 940, the computing device may generate a job to move the data formatted according to the third format. In some aspects, the job may comprise a replication job for the data formatted according to the third format. If the data is not formatted according to the third format (step 935: No), the computing device may proceed to determine whether the data is formatted according to other formats (not illustrated). In step 945, the computing device may prepare the job for transmission to one or more servers in the lower level environment and/or higher level environment.

Figure 10:
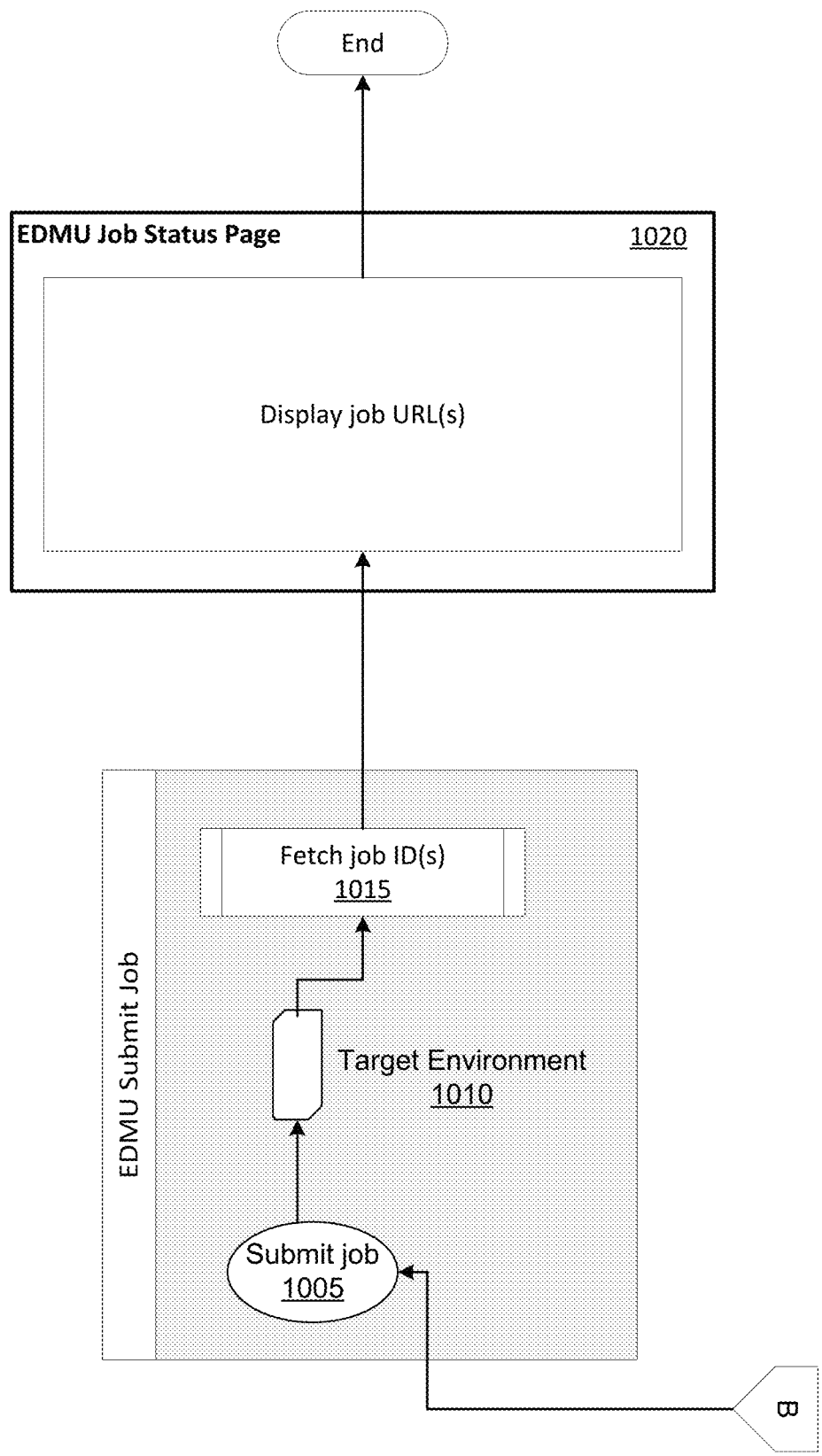
FIG. 10 illustrates an example of at least a portion of a flow diagram for efficiently storing, moving, and/or processing data across a plurality of computing clusters in which various aspects of the disclosure may be implemented.

FIG. 10 illustrates an example of at least a portion of a flow diagram for efficiently storing, moving, and/or processing data across a plurality of computing clusters in which various aspects of the disclosure may be implemented. In some aspects, the process illustrated in FIG. 10 may comprise an EDMU submit job process.

In step 1005, the computing device may transmit (e.g., submit) the job. The computing device may transmit instructions for performing the job to one or more of the source environment servers and/or to one or more of the target environment servers 1010. In response to receiving the instructions, the source environment server(s) and/or the target environment server(s) may attempt to move the selected data from the source environment server(s) to the target environment server(s). For example, one or more of the source environment servers may receive, from the computing device, instructions to move the data. Based on the instructions, one or more of the source environment servers may identify the data stored at the one or more data storage locations within the first cluster of servers. For example, the source environment server(s) may identify the data (and/or the storage location(s) of the data within the source environment server(s)) based on source service ID information, source information, and/or source path information. As previously explained, the information may be stored in a data file (e.g., as generated in step 805 and/or step 905), which may be accessible to the source environment server(s). The source environment server(s) may initiate transfer of the data to one or more data storage locations within the target environment server(s). The source environment server(s) may identify the target location(s) for the data based on target service ID information, target information, and/or target path information. The information may also be stored in the data file that is accessible to the source environment server(s).

The target environment server(s) may similarly receive, from the computing device, instructions for moving the data. Based on the instructions, the target environment server(s) may identify one or more data storage locations within the target environment server(s) to store the data transferred from the source environment server(s). The target environment server(s) may identify the storage locations based on, for example, target service ID information, target information, and/or target path information. As previously explained, the information may be stored in a data file (e.g., as generated in step 805 and/or step 905), which may be accessible to the target environment server(s). The target environment server(s) may store, at one or more identified data storage locations within the target environment server(s), the data transferred from the source environment server(s).

In step 1015, the computing device may generate (e.g., fetch) one or more job IDs for the jobs. In step 1020, the computing device may generate one or more uniform resource identifiers, such as uniform resource locators (URLs) for the one or more jobs. The computing device may transmit the URLs to the user device. The user device may display one or more of the URLs to the user, such as one or more hyperlinks. The URLs may be displayed on a job status page. Upon selection of a URL by the user of the user device, the status of the data transfer from the source environment(s) to the target environment(s) may be displayed on the user device.

Various aspects described herein may be embodied as a method, an apparatus, or as computer-executable instructions stored on one or more non-transitory and/or tangible computer-readable media. Any and/or all of the method steps described herein may be embodied in computer-executable instructions stored on a computer-readable medium, such as a non-transitory and/or tangible computer readable medium and/or a computer readable storage medium. Additionally or alternatively, any and/or all of the method steps described herein may be embodied in computer-readable instructions stored in the memory and/or other non-transitory and/or tangible storage medium of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. An apparatus comprising:
one or more processors; and
memory storing computer-executable instructions that, when executed by the one or more processors, cause the apparatus to:
   receive, from an authenticated user of a user device, an indication of a data storage location within a first cluster of servers;
   send, to the user device and based on the data storage location, an indication of a second plurality of clusters of servers to which the data can be moved, wherein the indication comprises a destination file within an available environment of the second plurality of servers;
   generate, based on a determination that the user is authorized to access one of the first cluster of servers or the second cluster of servers, a data file corresponding to the indication of the data storage location within the first cluster of servers and the destination file;
   generate, based on the data file, a job to move data stored at the data storage location within the first cluster of servers to a data storage location corresponding to the destination file within the second cluster of servers; and
   send, based on the job, to the first cluster of servers and the second cluster of servers, instructions to move data stored at the data storage location within the first cluster of servers to the one or more data storage locations within the second cluster of servers.

2. The apparatus of claim 1, wherein the instructions, when executed, cause the apparatus to:
determine a format of the data stored at the data storage location, and wherein the data file comprises the indication of the data storage location within the first cluster of servers, the indication of the data storage location within the second cluster of servers, and the format of the data.

3. The apparatus of claim 1, wherein the data storage location within the first cluster of servers comprises one or more files within the first cluster of servers, and wherein the data storage location within the second cluster of servers comprises one or more files within the second cluster of servers.

4. The apparatus of claim 1, wherein the instructions, when executed, cause the apparatus to:
   receive from the user device, a plurality of source paths associated with the data storage location within the first cluster of servers; and
   receive, from the user device, a plurality of destination paths associated with the data storage location within the second cluster of servers.

5. The apparatus of claim 1, wherein the instructions, when executed, cause the apparatus to:
   generate an identifier for the job to move data stored at the data storage location within the first cluster of servers to the data storage location within the second cluster of servers; and
   send, to the user device, the identifier.

6. The apparatus of claim 1, wherein the job is generated based on a data type of the data stored at the data storage location within the first cluster of servers.

7. A method comprising:
receiving, by a computing device from an authenticated user of a user device, an indication of a data storage location within a first cluster of servers;
sending, to the user device and based on the data storage location, an indication of a second plurality of clusters of servers to which the data can be moved, wherein the indication comprises a destination file within an available environment of the second plurality of servers;
generating, based on a determination that the user is authorized to access one of the first cluster of servers or the second cluster of servers, a data file corresponding to the indication of the data storage location within the first cluster of servers and the destination file;
generating, based on the data file, a job to move data stored at the data storage location within the first cluster of servers to a data storage location corresponding to the destination file within the second cluster of servers; and
sending, by the computing device based on the job, to the first cluster of servers and the second cluster of servers, instructions to move data stored at the data storage location within the first cluster of servers to the one or more data storage locations within the second cluster of servers.

8. The method of claim 7 comprising:
determining a format of the data stored at the data storage location, and wherein the data file comprises the indication of the data storage location within the first cluster of servers, the indication of the data storage location within the second cluster of servers, and the format of the data.

9. The method of claim 7, wherein the data storage location within the first cluster of servers comprises one or more files within the first cluster of servers, and wherein the data storage location within the second cluster of servers comprises one or more files within the second cluster of servers.

10. The method of claim 7 comprising:
receiving from the user device, a plurality of source paths associated with the data storage location within the first cluster of servers; and
receiving, from the user device, a plurality of destination paths associated with the data storage location within the second cluster of servers.

11. The method of claim 7 comprising:
generating an identifier for the job to move data stored at the data storage location within the first cluster of servers to the data storage location within the second cluster of servers; and
sending, to the user device, the identifier.

12. The method of claim 7 comprising:
generating, by the computing device, the job based on a data type of the data stored at the data storage location within the first cluster of servers.

13. A non-transitory computer readable medium storing instructions that, executed read by a computing device, causes the computing device to:
   receive, from an authenticated user of a user device, an indication of a data storage location within a first cluster of servers;
   send, to the user device and based on the data storage location, an indication of a second plurality of clusters of servers to which the data can be moved, wherein the indication comprises a destination file within an available environment of the second plurality of servers;
   generate, based on a determination that the user is authorized to access one of the first cluster of servers or the second cluster of servers, a data file corresponding to the indication of the data storage location within the first cluster of servers and the destination file;

generate, based on the data file, a job to move data stored at the data storage location within the first cluster of servers to a data storage location corresponding to the destination file within the second cluster of servers; and send, based on the job, to the first cluster of servers and the second cluster of servers, instructions to move data stored at the data storage location within the first cluster of servers to the one or more data storage locations within the second cluster of servers.

14. The non-transitory computer readable medium of claim 13, wherein the instructions, when executed, cause the computing device to:

determine a format of the data stored at the data storage location, and wherein the data file comprises the indication of the data storage location within the first cluster of servers, the indication of the data storage location within the second cluster of servers, and the format of the data.

15. The non-transitory computer readable medium of claim 13, wherein the data storage location within the first cluster of servers comprises one or more files within the first cluster of servers, and wherein the data storage location within the second cluster of servers comprises one or more files within the second cluster of servers.

16. The non-transitory computer readable medium of claim 13, wherein the instructions, when executed, cause the computing device to:

receive from the user device, a plurality of source paths associated with the data storage location within the first cluster of servers; and receive, from the user device, a plurality of destination paths associated with the data storage location within the second cluster of servers.

17. The non-transitory computer readable medium of claim 13, wherein the instructions, when executed, cause the computing device to:

generate an identifier for the job to move data stored at the data storage location within the first cluster of servers to the data storage location within the second cluster of servers; and send, to the user device, the identifier.

18. The non-transitory computer readable medium of claim 13, wherein the job is generated based on a data type of the data stored at the data storage location within the first cluster of servers.

* * * * *